(No Model.)

D. E. McKEE.
Sheep Shears.

No. 230,712. Patented Aug. 3, 1880.

Witnesses
Frank A. Brooks
Geo. H. Strong

Inventor
David E. McKee
By Dewey & Co.
Attys

N. PETERS, PHOTO-LITHOGRAPHER, WASHINGTON, D. C.

UNITED STATES PATENT OFFICE.

DAVID E. McKEE, OF POTTER VALLEY, CALIFORNIA.

SHEEP-SHEARS.

SPECIFICATION forming part of Letters Patent No. 230,712, dated August 3, 1880.

Application filed April 17, 1880. (No model.)

*To all whom it may concern:*

Be it known that I, DAVID E. MCKEE, of Potter Valley, county of Mendocino, and State of California, have invented an Improvement in Sheep-Shears; and I hereby declare the following to be a full, clear, and exact description thereof.

My invention relates to certain improvements in sheep-shears; and my improvements consist in interposing between the hinged handles a supplemental hand-lever hinged to one side of the handle, and having a swinging link or arm hinged to the other side of the handle, a spring being provided to throw the hinged handles open.

By grasping the shears by one side of the handle and the lever, instead of extending the grasp across both handles, the blades may be operated more readily and with greater power than in the ordinary way. What is known as the "hand-hold" is not so wide as where both sides of the handle have to be grasped, and the work of using the shears is materially reduced.

Suitable arrangements are made for guards for the thumb and fingers, and for preventing the overlapping of the blades and relieving the jar, as is more fully described in the accompanying drawings, in which—

Figure 1:
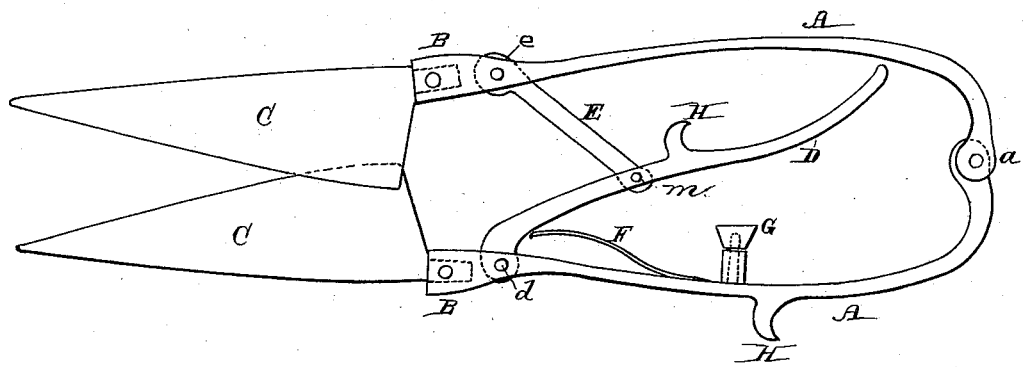
Figure 2:
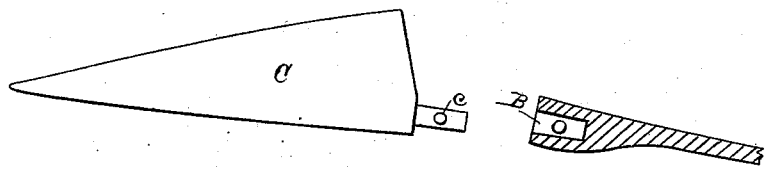

Figure 1 is a view of my device. Fig. 2 shows the blade removed from its socket.

Let A represent the bowed handles of the shears, which are hinged, as shown at *a*, at the rear end, so they may be opened and closed. At the ends are sockets B, into which the shanks *c* of the blades C fit, the blades being held in place by rivets, bolts, or screws, preferably the latter, so as to be removable when it is necessary to replace them.

Between the blades is the hand-lever D, hinged to one handle, as shown at *d*. This lever has hinged to it a link or swinging arm, E, hinged also, as shown at *e*, to the opposite handle.

A spring, F, behind the hand-lever serves to throw the blades apart when pressure is relieved. An elastic stop, G, on the handle prevents the lever D being drawn too near the handle, this being set so that when closed the edge of one blade will reach the back of the other in the usual manner of sheep-shears. This stop or bumper has a cap of cork or rubber to take off the jar on the closing of the blades. Guards H H on the handle and the lever regulate the position of the thumb and forefinger when grasping the shears.

In this device the shearer has, by means of the lever, a great deal of power in his gripe, and can handle the shears with comparatively slight exertion.

Another important feature of this device is the way in which the hand-hold is made. In the ordinary bow-handled shears, in order to get the full cutting power of the blades, said blades must be spread far apart by the handles, and the hand must be correspondingly opened. Now, the greatest power of the gripe of the hand is in the thumb and forefinger, and with the spring bow-handle they are opened widely from each other, so that it is difficult to bring much power to bear on the first part of the closing motion. The skin of the hand is strained and broken by this alternate stretching and closing, and oftentimes the strain on the hands is so great that the men are disabled from work.

In my shears the hand does not have to be opened very wide, while at the same time the blades are just as much separated to make the cut as in the old bow-spring cutters. The thumb and forefinger do not have to be separated so far as the thumb and little finger, and never so far as to lessen the power of the gripe.

The handle will last for many years, and new blades may be provided at any time. These handles can be made of suitable sizes for varying sizes of hands. A man can purchase one to suit his size of hand, and, finding one to suit him, can always duplicate it.

When the blades are worn out they can be removed and replaced without detriment to the handle, and when the new blades are in the shears are as good as new.

In griping the ordinary shears the little finger has to do the work till the stouter part of the hand can be brought to bear; but with my lever-handle this is not the case, a good gripe being always maintained.

For sharpening the shears the rivet *m*, joining the lever and its arm, is slipped out, when the hinged handle allows the blades to be separated so they may be sharpened. In the ordinary bow-handled shears the operation of whetting is a difficult one, but by opening the handle wide, as I can do, it is very much simplified and requires no special skill.

The elastic bumper or stop is very useful, since it takes off the jar incident to closing the blades, which repeated concussion in the ordinary shears is injurious to the hand.

Having thus described my invention, what I claim as new, and desire to secure by Letters Patent, is—

1. In combination with the handles A, hinged as shown at $a$, the lever D, with its spring F, and swinging arm E, whereby the cutting-blades are operated substantially as herein described.

2. In sheep-shears provided with hinged handles and having an operating-lever between the handles, the elastic stop or bumper G, whereby the jar on closing the shears is obviated, substantially as herein described.

3. The improvement in sheep-shears consisting of the handles A, hinged as shown at $a$, the lever D, spring F, and hinged arm E, and the elastic stop G and guards H H, with the removable blades C, substantially as and for the purpose herein described.

In witness whereof I have hereunto set my hand.

DAVID E. McKEE.

Witnesses:
THOMAS J. COMPTON,
WESLEY W. BOYES.